US009495846B2

(12) United States Patent
Chang et al.

(10) Patent No.: US 9,495,846 B2
(45) Date of Patent: *Nov. 15, 2016

(54) TACTILE FEEDBACK APPARATUS

(71) Applicant: Industrial Technology Research Institute, Hsinchu (TW)

(72) Inventors: Chih-Chia Chang, Hsinchu County (TW); Chen-Pang Kung, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 227 days.

This patent is subject to a terminal disclaimer.

(21) Appl. No.: 14/141,447

(22) Filed: Dec. 27, 2013

(65) Prior Publication Data

US 2015/0035657 A1 Feb. 5, 2015

(30) Foreign Application Priority Data

Aug. 5, 2013 (TW) ............................ 102127976 A

(51) Int. Cl.
*H04B 3/36* (2006.01)
*G08B 6/00* (2006.01)

(52) U.S. Cl.
CPC ....................................... *G08B 6/00* (2013.01)

(58) Field of Classification Search
CPC ....................................................... G08B 6/00
USPC ....................... 340/506, 438, 407.2; 345/182
See application file for complete search history.

(56) References Cited

U.S. PATENT DOCUMENTS 6,806,868 B2 10/2004 Chuang
7,511,706 B2 3/2009 Schena
7,924,144 B2 4/2011 Makinen et al.
8,401,239 B2 3/2013 Porikli et al.
2006/0158440 A1 7/2006 Ashenbrenner
2010/0053113 A1 3/2010 Wu et al.
2010/0141407 A1* 6/2010 Heubel .................. G06F 1/163 340/407.1
2010/0194547 A1 8/2010 Terrell et al.
2011/0109584 A1 5/2011 Linjama et al.
2011/0267182 A1* 11/2011 Westerinen ............. G06F 3/016 340/407.2
2012/0127088 A1 5/2012 Pance et al.
2012/0295709 A1 11/2012 Adhikari (Continued)

FOREIGN PATENT DOCUMENTS

TW M363640 8/2009
TW M375253 3/2010

(Continued)

OTHER PUBLICATIONS

"Office Action of Taiwan Counterpart Application", issued on May 20, 2015, p. 1-p. 15.

(Continued)

*Primary Examiner* — Daryl Pope
(74) *Attorney, Agent, or Firm* — Jianq Chyun IP Office

(57) ABSTRACT

A tactile feedback apparatus is provided, which includes a signal generator and a tactile feedback structure. The signal generator provides a driving signal. The tactile feedback structure is connected to the signal generator and provides a tactile feedback signal in response to the driving signal when an object surface is touched or a housing of the tactile feedback apparatus is touched. The tactile feedback signal is related to a tactile sensation. The tactile feedback signal is related to an electrical property of the driving signal.

16 Claims, 9 Drawing Sheets

(56) References Cited

U.S. PATENT DOCUMENTS

| | | | |
|---|---|---|---|
| 2013/0106720 A1 | 5/2013 | Shahparnia et al. | |
| 2014/0340328 A1* | 11/2014 | Kameyama | G06F 3/03545 345/173 |

FOREIGN PATENT DOCUMENTS

| | | |
|---|---|---|
| TW | M387304 | 8/2010 |
| TW | M404422 | 5/2011 |
| TW | 201218039 | 5/2012 |
| TW | 201228694 | 7/2012 |
| TW | 201239699 | 10/2012 |

OTHER PUBLICATIONS

Olivier Bau et al., "REVEL: Tactile Feedback Technology for Augmented Reality," ACM Transactions on Graphics, vol. 31, No. 4, Article 89, Jul. 2012.

Clifton Forlines et al., "Evaluating Tactile Feedback and Direct vs. Indirect Stylus Input in Pointing and Crossing Selection Tasks," CHI 2008 Proceedings Tactile and Haptic User Interfaces, Aug. 2008, pp. 1563.

Chris Harrison et al., "Providing Dynamically Changeable Physical Buttons on a Visual Display," CHI 2009—Clicking on Buttons, Apr. 2009, pp. 299-308.

Akio Yamamoto et al., "Electrostatic Tactile Display with Thin Film Slider and Its Application to Tactile Telepresentation Systems," IEEE Transactions on Visualization and Computer Graphics, Mar. 2006 vol. 12, No. 2, pp. 168-177.

Ali Israr et al., "Frequency and amplitude discrimination along the kinestheticcutaneous on tinuum in the presence of masking stimuli," J. Acoust. Soc. Am, Nov. 2006, pp. 2789-2800.

Stephen Brewster et al., "Tactile Feedback for Mobile Interactions," CHI 2007 Proceedings. Mobile Interaction, Apr. 2007, pp. 159-162.

Kurt A. Kaczmarek et al., "Polarity Effect in Electrovibration for Tactile Display," IEEE Transactions on Biomedical Engineering, Oct. 2006 vol. 53, No. 10, pp. 2047-2054.

* cited by examiner

TACTILE FEEDBACK APPARATUS

CROSS-REFERENCE TO RELATED APPLICATION

This application claims the priority benefit of Taiwan application serial no. 102127976, filed on Aug. 5, 2013. The entirety of the above-mentioned patent application is hereby incorporated by reference herein and made a part of this specification.

BACKGROUND

1. Technical Field

The disclosure relates to a tactile feedback apparatus.

2. Related Art

In today's electronic technology, it has become a trend to improve interactions between an electronic device and a user by using a touch technology. In use of a touch panel, the user uses a finger or a touch input device to transmit a control command to the electronic device through the touch panel. The above-said method is capable of executing control actions of the electronic device. It lacks a realistic response as a tactile feedback in such control method of using the touch panel. Therein, the tactile feedback refers to a sensational reaction generated when the finger or the touch input device touches a screen, instead of only visual variations in response.

SUMMARY

An embodiment of the disclosure is related to a tactile feedback apparatus, which includes a signal generator and a tactile feedback structure. The signal generator provides a driving signal. The tactile feedback structure is connected to the signal generator and provides a tactile feedback signal in response to the driving signal when an object surface is touched or a housing of the tactile feedback apparatus is touched. The tactile feedback signal is related to a tactile sensation. The tactile feedback signal is related to an electrical property of the driving signal.

To make the disclosure more comprehensible, several embodiments accompanied with drawings are described in detail as follows.

DETAILED DESCRIPTION OF DISCLOSED EMBODIMENTS

Figure 1:
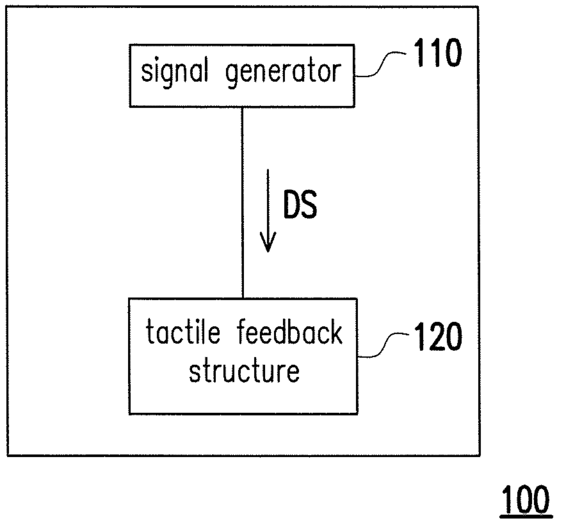
FIG. 1 is a schematic block diagram illustrating a tactile feedback apparatus according to an embodiment of the disclosure.

FIG. 1 is a schematic block diagram illustrating a tactile feedback apparatus according to an embodiment of the disclosure. In the present embodiment, when a user touches an object surface by using a tactile feedback apparatus 100, the tactile feedback apparatus 100 generates an action force together with the object surface due to electrical fields after some mechanisms are executed. After the action force is generated, the user correspondingly senses a tactile sensation fed back by the tactile feedback apparatus 100. The tactile sensation is, for example, a roughness, but the disclosure is not limited thereto, since the user may have other ways of describing related acknowledge to the tactile sensation. The object surface includes a conducting electrode, the conducting electrode covered by any of at least single-layer insulating layer, the conducting electrode covered by any of at least single-layer semiconductor layer, the conducting electrode or an insulating layer covered by any of at least single-layer insulating layer combining a semiconductor structure, an insulating layer or a semiconductor covered by any of at least single-layer semiconductor layer, and/or a semiconductor layer covered by any of at least single-layer insulating layer.

Referring to FIG. 1, the tactile feedback apparatus 100 includes a signal generator 110 and a tactile feedback structure 120. The signal generator 110 provides a driving signal DS after an electrical power provided by a power supply module (not illustrated) is received. The power supply module provides, for example, an alternate current (AC) or a direct current (DC). The driving signal DS is, for example, a sinusoidal signal, but the disclosure is not limited thereto.

The tactile feedback structure 120 is connected to the signal generator 110 and provided a tactile feedback signal in response to the driving signal DS when the object surface is touched by the tactile feedback apparatus 100. The tactile feedback signal is, for example, a voltage signal correspondingly generated on the tactile feedback structure 120 according to the driving signal DS, but the disclosure is not limited thereto. In this case, if the object surface is provided with an electrical field with a polarity identical to said voltage signal, an action force of mutual repulsion is generated between the tactile feedback structure 120 and the object surface. If the object surface is provided with an electrical field with a polarity opposite to said voltage signal, an action force of mutual attraction is generated between the tactile feedback structure 120 and the object surface. In case the action force of mutual repulsion or mutual attraction is large enough, the roughness is generated when moving process the tactile feedback apparatus 100 on the object surface.

For instance, when the tactile feedback structure 120 generate the tactile feedback signal according to the driving signal DS which is characterized as the sinusoidal signal, while the object surface is provided with a positive electrical field, the tactile feedback apparatus 100 generates an action force with the positive electrical field when touching (or approaching closely to) the object surface, and generates a feedback sensation when moving the tactile feedback apparatus 100 on the object surface. A common sinusoidal signal is a signal with periodic undulation along time, thus a size of the action force also has a periodical variation. When the user slides the tactile feedback apparatus 100 on the object surface, the periodical variation of the action force allows the user to sense the feedback sensation from the tactile feedback apparatus 100 when sliding the tactile feedback apparatus 100. Therein, the feedback sensation is, for example, a roughness. Form another prospective, the tactile feedback apparatus 100 is capable of providing the user the tactile sensation similar to concave-convex changes on the object surface when the user slides the tactile feedback apparatus 100 on the object surface.

Persons with ordinary skill in the art should understand that, the tactile feedback signal corresponding to the driving signal DS (regardless of what manner it is characterized in) is related to an electrical characteristic of the driving signal DS. The electrical property is, for example, a waveform frequency, a waveform shape, a waveform phase and a waveform amplitude of the driving signal DS, but the disclosure is not limited thereto.

Since a variation of the tactile feedback signal correspondingly changes the action force between the tactile feedback apparatus 100 and the object surface, the tactile feedback signal is also related to the tactile sensation. For instance, in case the action force corresponding to the tactile feedback signal is relatively smaller, the user may sense the tactile sensation similar to that of the tactile feedback apparatus 100 being touched on a smoother object surface. In case the action force corresponding to the tactile feedback signal is relatively greater, the user may sense the tactile sensation similar to that of the tactile feedback apparatus 100 being touched on a rougher object surface.

In other embodiments, a switch structure (not illustrated) is further disposed between the signal generator 110 and the tactile feedback structure 120. The switch structure is, for example, a mechanical switch which is turned on or off in response to a switching operation of the user. For instance, the switch structure is, for example, connected to a power switch (not illustrated) on a housing 210. Once the user switches the power switch on, the switch structure is correspondingly switched to an on-state. The signal generator 110 provides the driving signal DS to the tactile feedback structure 120 when the switch structure is in the on-state. In this case, the tactile feedback structure 120 generates the action force together with the object surface so as to provide the tactile sensation. From another prospective, in case the switch is in an off-state, the tactile feedback apparatus 100 is incapable of providing the tactile sensation since the driving signal DS is not received by the tactile feedback structure 120. In addition, the housing 210 is coated with a conductive layer so as to facilitate each element in the tactile feedback apparatus 100 to be connected to a ground. Or, the tactile feedback apparatus 100 has a conductive characteristic so as to facilitate each element therein to be connected to the ground.

Figure 2:
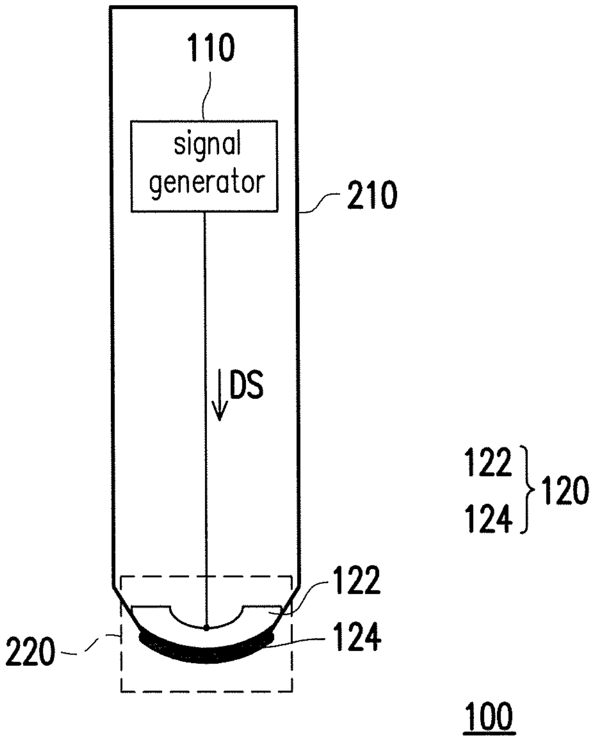
FIG. 2 is a schematic diagram illustrating a tactile feedback apparatus according to an embodiment of the disclosure.

FIG. 2 is a schematic diagram illustrating a tactile feedback apparatus according to an embodiment of the disclosure. In the present embodiment, the tactile feedback apparatus 100 is implemented in a manner of, for example, a touch input device. Therein, the tactile feedback apparatus 100 includes the housing 210 and an end 220. The end 220 is, for example, an end of the touch input device which is used by the user to touch the object surface. The tactile feedback structure 120 is disposed at the end 220 and generated various interactions together with the object surface as mentioned above.

Referring to FIG. 2, the tactile feedback structure 120 may include an electrode 122 and an insulator 124. The electrode 122 is connected to the signal generator 110 and provided the tactile feedback signal in response to the driving signal DS from the signal generator 110. The insulator 124 is disposed at one side of the electrode 122 and provides the tactile feedback apparatus 100 a contact portion for touching the object surface. When the user uses the end 220 of the tactile feedback apparatus 100 to touch the object surface, it is a touch by using the insulator 124. As described in the embodiment of FIG. 1, the electrode 122 generates the tactile feedback signal according to the driving signal DS, thus when the user uses the end 220 to touch the object surface having the electrical field with the polarity identical or opposite to that of the tactile feedback signal, the user senses the tactile sensation corresponding to the action force between the electrical fields of the electrode 122 and the object surface. Details regarding the action force generated between the tactile feedback apparatus 100 and the object surface refer to the description in the embodiment of FIG. 1, and related description is omitted herein. The electrode 122 are designed as to be partially in contact with the insulator 124 depicted in FIG. 2, in other embodiments, a designer may design the electrode 122 as to be fully in contact with the insulator 124, and the disclosure is not limited thereto.

Figure 3:
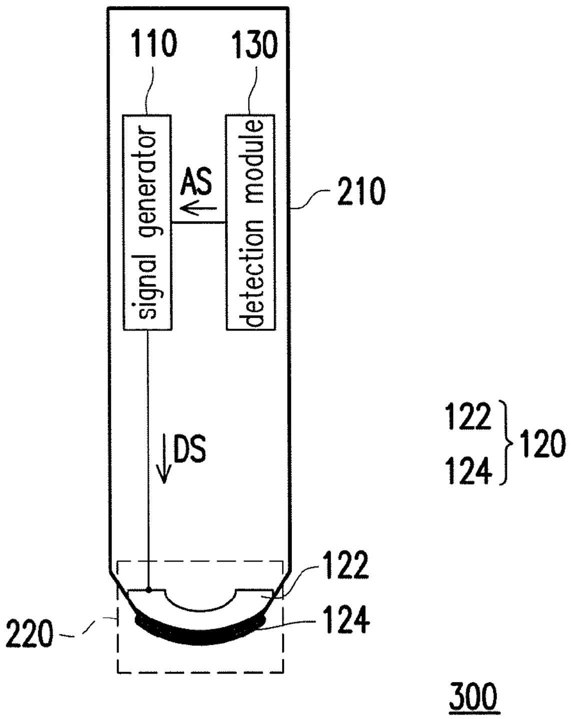
FIG. 3 is a schematic diagram illustrating the tactile feedback apparatus according to the embodiment of FIG. 2.

FIG. 3 is a schematic diagram illustrating the tactile feedback apparatus according to the embodiment of FIG. 2. In the present embodiment, a tactile feedback apparatus 300 further includes a detection module 130. The detection module 130 is connected to the signal generator 110 and detected whether a pressing operation occurs. The pressing operation is, for example, a pressing (triggering) action occurred on the housing 210, or a pressing (triggering) action occurred between the tactile feedback structure 120 and the object surface. When the detection module 130 detects that the pressing operation occurs, the detection module 130 provides an activating signal AS to the signal generator 110 so as to control the signal generator 110 to provide the driving signal DS. From another prospective, the detection module 130 serves as a switch of the tactile feedback structure 120 for providing the tactile feedback signal. When the detection module 130 determines that the pressing operation occurs, the tactile feedback structure 120 correspondingly generates the tactile feedback signal, and the tactile feedback apparatus 300 feedbacks the tactile sensation to the user. When the pressing operation is not detected by the detection module 130, the driving signal DS is not provided to the tactile feedback structure 120 since the activating signal AS is not received by the signal generator 110, so as to achieve an effect of saving power.

Several embodiments for detecting the pressing operation are provided below as to further describe possible implementations of the disclosure. Persons with ordinary skill in the art should appreciate that the following embodiments are merely used for illustrating the spirit of the disclosure instead of limiting the possible implementations of the disclosure.

Figure 4A:
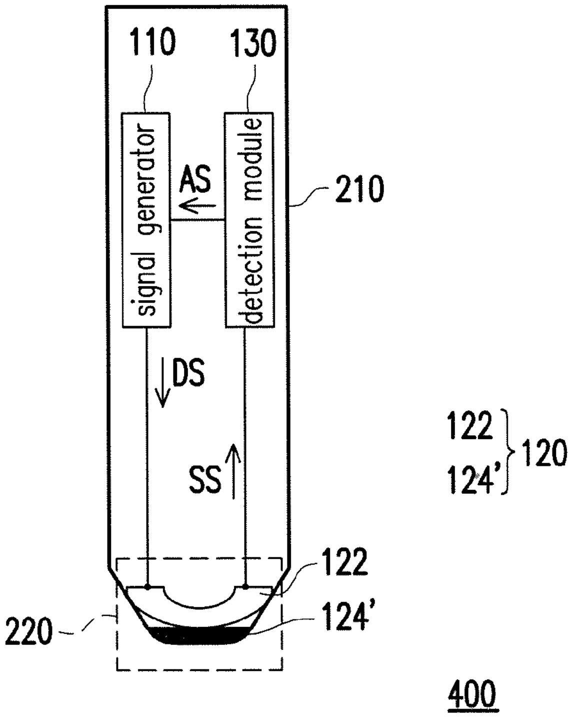
FIG. 4A is a schematic diagram illustrating the tactile feedback apparatus according to the embodiment of FIG. 3.

FIG. 4A is a schematic diagram illustrating the tactile feedback apparatus according to the embodiment of FIG. 3. In the present embodiment, an insulator (corresponding to the insulator 124 depicted in FIG. 3) of the tactile feedback structure 120 is implemented by using a piezoelectric film 124'. Further, the piezoelectric film 124' is connected to the detection module 130 through the electrode 122, and detected whether the pressing operation occurs between the tactile feedback structure 120 and the object surface. Once the pressing operation occurs, the piezoelectric film 124' provides a sensing signal SS to the detection module 130 through the electrode 122 in response to a pressure of the pressing operation, and the detection module 130 provides the activating signal AS to the signal generator 110. The signal generator 110 provides the driving signal DS to the electrode 122 in response to the activating signal AS. The electrode 122 generates the action force together with the object surface according to the method described in the embodiment of FIG. 1, and a tactile feedback apparatus 400 provides the user the tactile sensation. When the user uses the piezoelectric film 124' to touch (e.g, press) the object surface, the electrode 122 correspondingly generates the tactile feedback signal, and the electrode 122 generates various interactions together with the object surface as taught previously.

In other embodiments, the switch structure (not illustrated) as mentioned in the embodiment of FIG. 1 may be further disposed between the detection module 130 and the tactile feedback structure 120 of FIG. 4A, which is turned on or off in response to the switching operation of the user. When the switch structure is in the on-state, the sensing signal SS is transmitted to the detection module 130 and the detection module 130 provides the activating signal AS to the signal generator 110. The signal generator 110 provides the driving signal DS to the electrode 122 in response to the activating signal AS, and the electrode 122 generates various interactions together with the object surface as taught previously. When the switch structure is in the off-state, the tactile sensation is not correspondingly provided by the tactile feedback apparatus 400 since the sensing signal SS is not transmitted to the detection module 130.

Figure 4B:
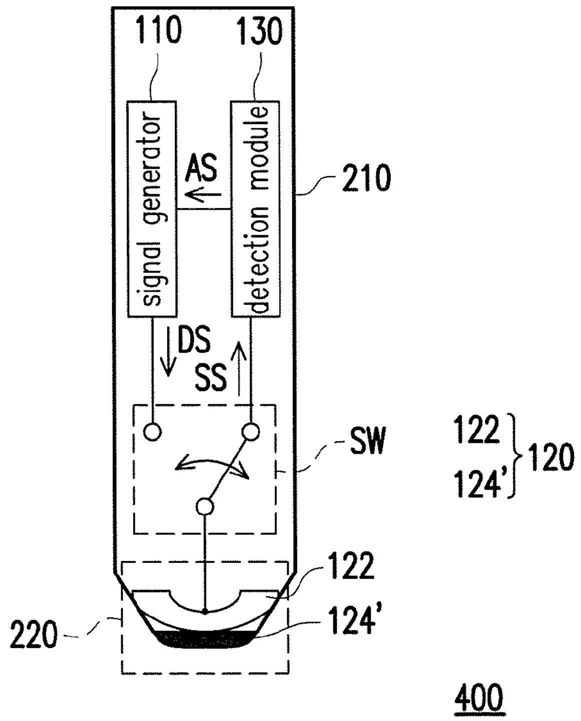
FIG. 4B is a schematic diagram illustrating the tactile feedback apparatus according to the embodiment of FIG. 4A.

FIG. 4B is a schematic diagram illustrating the tactile feedback apparatus according to the embodiment of FIG. 4A. In the present embodiment, the tactile feedback apparatus 400 further includes a switch SW having a first terminal coupled to the electrode 122, a second terminal coupled to the detection module 130 and a third terminal coupled to the signal generator 110. The switch SW is switched back and forth between the detection module 130 and the signal generator 110 in response to a control signal of a controller (not illustrated). In case the switch SW is connected to the detection module 130, when the piezoelectric film 124' touches the object surface, the piezoelectric film 124' provides the sensing signal SS to the detection module 130 through the electrode 122, and the signal generator 110 correspondingly generates the driving signal DS. The driving signal DS is transmitted to the electrode 122 when the switch SW is switched to connect the signal generator 110, and the electrode 122 generates various interactions together with the object surface as taught previously.

Figure 5A:
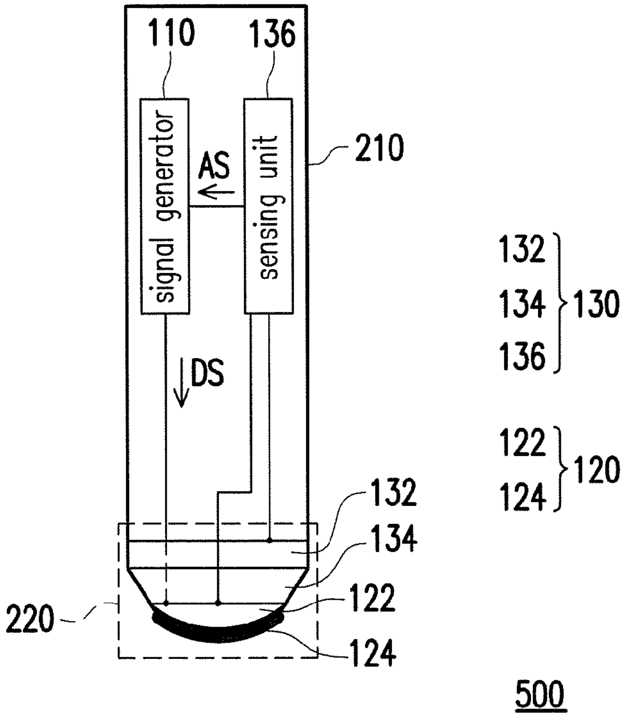
FIG. 5A is a schematic diagram illustrating the tactile feedback apparatus according to the embodiment of FIG. 3.

FIG. 5A is a schematic diagram illustrating the tactile feedback apparatus according to the embodiment of FIG. 3. In a tactile feedback apparatus 500 of the present embodiment, the detection module 130 includes a specific electrode 132, a specific insulator 134 and a sensing unit 136. The specific electrode 132 is disposed at the end 220, and capable of generating a capacitance variation together with the electrode 122 in response to the pressing operation. The specific insulator 134 is disposed between the electrode 122 and the specific electrode 132 and insulated the electrode 122 from the specific electrode 132. The sensing unit 136 is connected to the signal generator 110, the specific electrode 132 and the electrode 122, and provides the activating signal AS to the signal generator 110 in response to the capacitance variation.

When the end 220 of the tactile feedback apparatus 500 touches the object surface, the capacitance variation correspondingly occurs between the specific electrode 132 and the electrode 122. Therefore, according to the capacitance variation, the sensing unit 136 determines that the pressing operation occurs, and the activating signal AS is provided to control the signal generator 110 to provide the driving signal DS. The electrode 122 generates the tactile feedback signal according to the driving signal DS, and various interactions are generated together with the object surface as taught previously, and related description is omitted herein.

In other embodiments, the switch structure (not illustrated) as mentioned in the embodiment of FIG. 1 may be further disposed between the sensing unit 136 and the specific electrode 132 of FIG. 5A, which is turned on or off in response to the switching operation of the user. The sensing unit 136 detects the capacitance variation between the specific electrode 132 and the electrode 122 when the switch structure is in the on-state. When the switch structure is in the off-state, the tactile sensation is not correspondingly provided by the tactile feedback apparatus 500 since the sensing unit 136 does not detect the capacitance variation between the specific electrode 132 and the electrode 122.

Figure 5B:
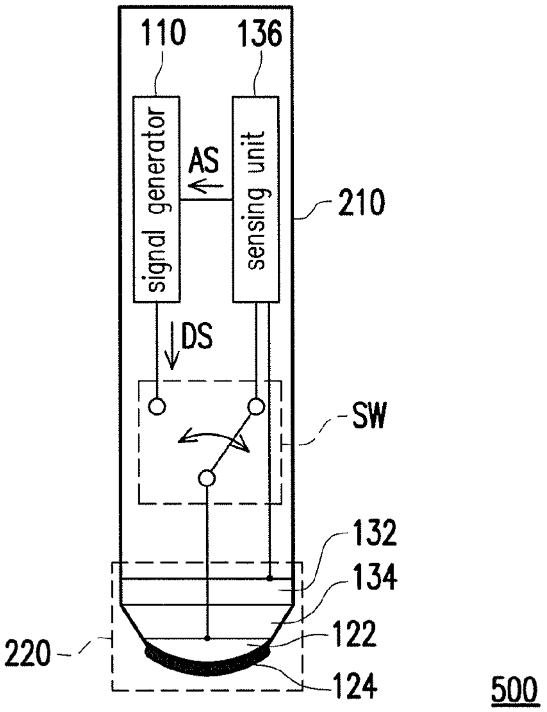
FIG. 5B is a schematic diagram illustrating the tactile feedback apparatus according to the embodiment of FIG. 5A.

FIG. 5B is a schematic diagram illustrating the tactile feedback apparatus according to the embodiment of FIG. 5A. In the present embodiment, the tactile feedback apparatus 500 further includes a switch SW having a first terminal coupled to the electrode 122, a second terminal coupled to the sensing unit 136 and a third terminal coupled to the signal generator 110. The switch SW is switched back and forth between the sensing unit 136 and the signal generator 110 in response to a control signal of a controller (not illustrated). When the switch SW is connected to the sensing unit 136 and the capacitance variation occurs between the specific electrode 132 and the electrode 122, according to the capacitance variation, the sensing unit 136 determines that the pressing operation occurs, and the activating signal AS is provided to control the signal generator 110 to provide the driving signal DS. The driving signal DS is transmitted to the electrode 122 when the switch SW is switched to connect the signal generator 110, and the electrode 122 generates various interactions together with the object surface as taught previously.

In the present embodiment, based on demands of the designer, it may be designed that when the pressing operation occurs, a resistance variation occurs between the specific electrode 132 and the electrode 122 in response to the pressing operation. The sensing unit 136 provides the activating signal AS to the signal generator 110 in response to the resistance variation between the specific electrode 132 and the electrode 122, and the electrode 122 generates various interactions together with the object surface as taught previously, and related description is omitted herein.

Figure 6:
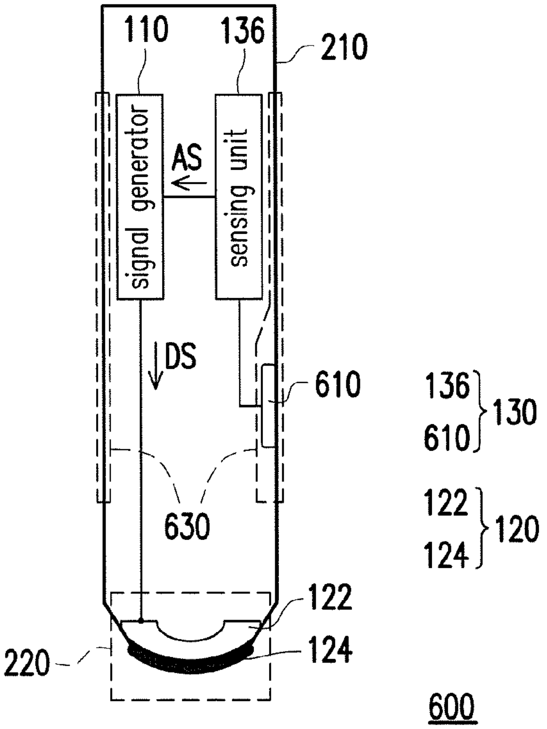
FIG. 6 is a schematic diagram illustrating the tactile feedback apparatus according to the embodiment of FIG. 3.

FIG. 6 is a schematic diagram illustrating the tactile feedback apparatus according to the embodiment of FIG. 3. In a tactile feedback apparatus 600 of the present embodiment, the detection module 130 includes the sensing unit 136 and a specific electrode 610. The housing 210 may include a grip portions 630 located at, for example, a location where the user may generally hold when holding the tactile feedback apparatus 600. The specific electrode 610 is disposed at the grip portion 630. When the user holds the tactile feedback apparatus 600 (i.e., when the pressing operation occurs on the housing 210), the specific electrode 610 is touched and the resistance variation and/or the capacitance variation (e.g., a self capacitance variation) occurs on the specific electrode 610. When the resistance variation and/or the capacitance variation occurs, the sensing unit 136 provides the activating signal AS to the signal generator 110 in response to the resistance variation and/or the capacitance variation, and the electrode 122 generates various interactions together with the object surface as taught previously, and related description is omitted herein.

Figure 7:
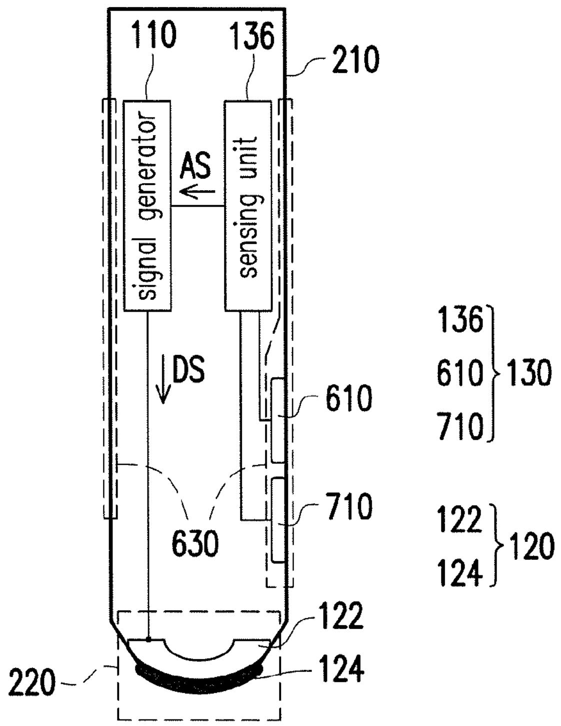
FIG. 7 is a schematic diagram illustrating the tactile feedback apparatus according to the embodiment of FIG. 6.

FIG. 7 is a schematic diagram illustrating the tactile feedback apparatus according to the embodiment of FIG. 6. In a tactile feedback apparatus 700 of the present embodiment, the detection module 130 further includes a specific electrode 710. The specific electrode 710 is also disposed at the grip portion 630. When the user holds the tactile feedback apparatus 700 (i.e., when the pressing operation occurs on the housing 210), the specific electrodes 610 and 710 are touched, and the resistance variation and/or the capacitance variation (e.g., a mutual capacitance variation) occurs between the specific electrodes 610 and 710. When the resistance variation and/or the capacitance variation occurs, the sensing unit 136 provides the activating signal AS to the signal generator 110 in response to the resistance variation and/or the capacitance variation, and the electrode 122 generates various interactions together with the object surface as taught previously, and related description is omitted herein.

In other embodiments, the sensing unit 136 depicted in FIG. 7 may detect whether the self capacitance variation occurs on the specific electrodes 610 and 710, respectively. When the self capacitance variation occurs on the specific electrodes 610 and 710, the sensing unit 136 also correspondingly provides the activating signal AS to the signal generator 110, and the electrode 122 generates various interactions together with the object surface as taught previously, and related description is omitted herein.

Figure 8A:
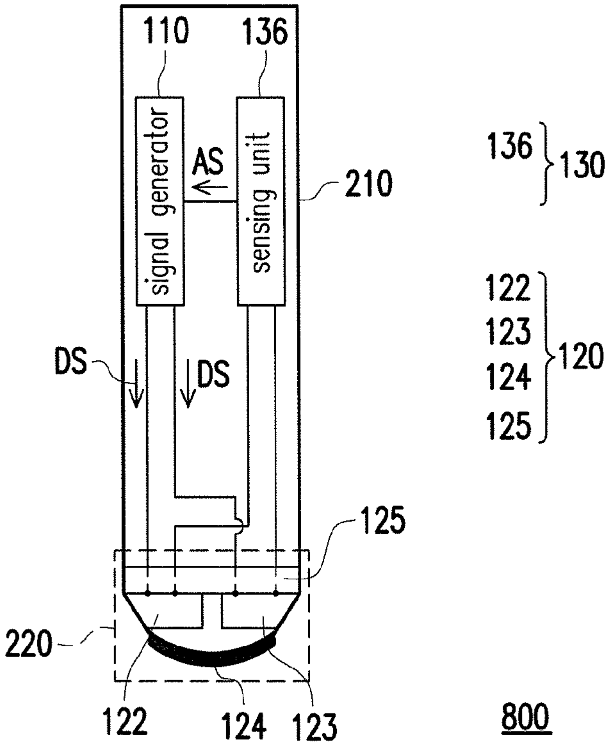
FIG. 8A is a schematic diagram illustrating the tactile feedback apparatus according to the embodiment of FIG. 3.

FIG. 8A is a schematic diagram illustrating the tactile feedback apparatus according to the embodiment of FIG. 3. In a tactile feedback apparatus 800 of the present embodiment, the tactile feedback structure 120 further includes a specific electrode 123 and a specific insulator 125. The specific electrode 123 is connected to the signal generator 110 and the insulator 124. The specific insulator 125 is connected to the electrode 122 and the specific electrode 123. The specific electrode 123 and the electrode 122 are disposed on an identical side of the insulator 124, and the specific electrode 123 and the electrode 122 are disposed between the insulator 124 and the specific insulator 125. The detection module 130 includes the sensing unit 136 which is connected to the signal generator 110, the electrode 122 and the specific electrode 123, and when the capacitance variation occurs between the electrode 122 and the specific electrode 123, the activating signal AS is provided to the signal generator 110. The driving signal DS is provided to the electrode 122, the signal generator 110 provides the driving signal DS to the specific electrode 123, and the tactile feedback signal is generated by the specific electrode 123.

When the user uses the end 220 of the tactile feedback apparatus 500 to touch the object surface, the capacitance variation (e.g., the mutual capacitance variation) occurs correspondingly between the electrode 122 and the specific electrode 123. The sensing unit 136 determines that the pressing operation occurs between the tactile feedback structure 120 and the object surface according to the capacitance variation, and the activating signal AS is provided to control the signal generator 110 to provide the driving signal DS. The electrode 122 and the specific electrode 123 generates the tactile feedback signal according to the driving signal DS, and various interactions are generated together with the object surface as taught previously, and related description is omitted herein.

Further, despite that a component for insulating the electrode 122 and the specific electrode 123 is not illustrated between the electrode 122 and the specific electrode 123 in FIG. 8A, in other embodiments, the designer may dispose a specific insulating layer between the electrode 122 and the specific electrode 123 for insulating the electrode 122 from the specific electrode 123. Or, the designer may also design the insulator 124 as to locate between the electrode 122 and the specific electrode 123 for insulating the electrode 122 from the specific electrode 123, but the possible implementations of the disclosure are not limited to the above.

Figure 8B:
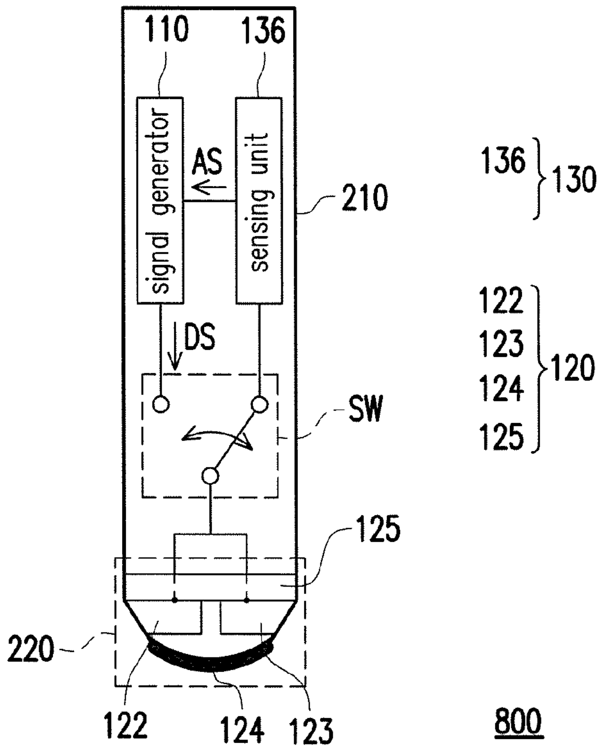
FIG. 8B is a schematic diagram illustrating the tactile feedback apparatus according to the embodiment of FIG. 8A.

FIG. 8B is a schematic diagram illustrating the tactile feedback apparatus according to the embodiment of FIG. 8A. In the present embodiment, the tactile feedback apparatus 800 further includes a switch SW having a first terminal coupled to the electrode 122 and the specific electrode 123, a second terminal coupled to the sensing unit 136 and a third terminal coupled to the signal generator 110. The switch SW is switched back and forth between the sensing unit 136 and the signal generator 110 in response to a control signal of a controller (not illustrated). When the switch SW is connected to the sensing unit 136 and the capacitance variation occurs between the electrode 122 and the specific electrode 123, according to the capacitance variation, the sensing unit 136 determines that the pressing operation occurs, and the activating signal AS is provided to control the signal generator 110 to provide the driving signal DS. The driving signal DS is transmitted to the electrode 122 and the specific electrode 123 when the switch SW is switched to connect the signal generator 110, and the electrode 122 and the specific electrode 123 generate various interactions together with the object surface as taught previously.

Figure 9A:
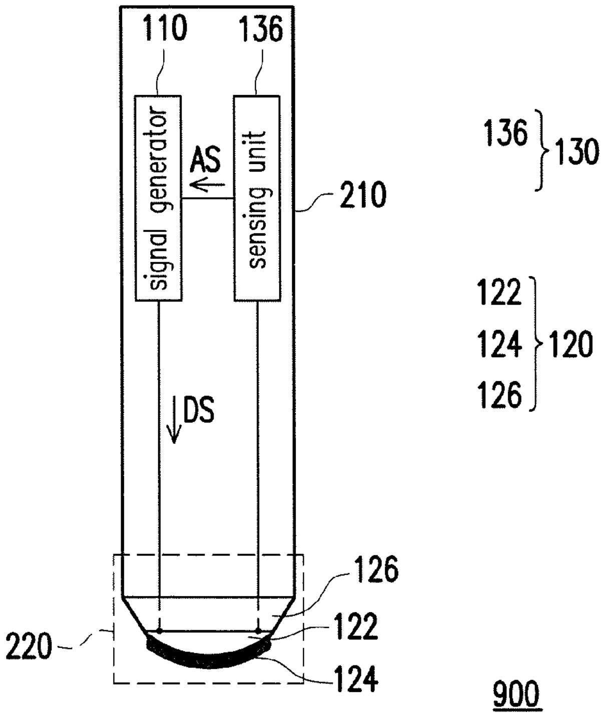
FIG. 9A is a schematic diagram illustrating the tactile feedback apparatus according to the embodiment of FIG. 3.

FIG. 9A is a schematic diagram illustrating the tactile feedback apparatus according to the embodiment of FIG. 3. In a tactile feedback apparatus 900 of the present embodiment, the tactile feedback structure 120 further includes a specific insulator 126. The specific insulator 126 is connected to the electrode 122, and the insulator 124 and the specific insulator 126 are respectively disposed at a first side and a second side of the electrode 122. The detection module 130 includes the sensing unit 136 connected to the signal generator 110 and the electrode 122. When the capacitance variation (e.g., the self capacitance) occurs on the electrode 122, the sensing unit 136 provides the activating signal AS to the signal generator 110. The signal generator 110 provides the driving signal DS to the electrode 122, and the tactile feedback signal is generated by the electrode 122.

When the user uses the end 220 to touch the object surface, the capacitance variation (e.g., the self capacitance variation) occurs correspondingly on the electrode 122. The sensing unit 136 determines that the pressing operation occurs between the tactile feedback structure 120 and the object surface according to the capacitance variation, and the activating signal AS is provided to control the signal generator 110 to provide the driving signal DS. The electrode 122 generates the tactile feedback signal according to the driving signal DS, and various interactions are generated together with the object surface as taught previously, and related description is omitted herein.

Figure 9B:
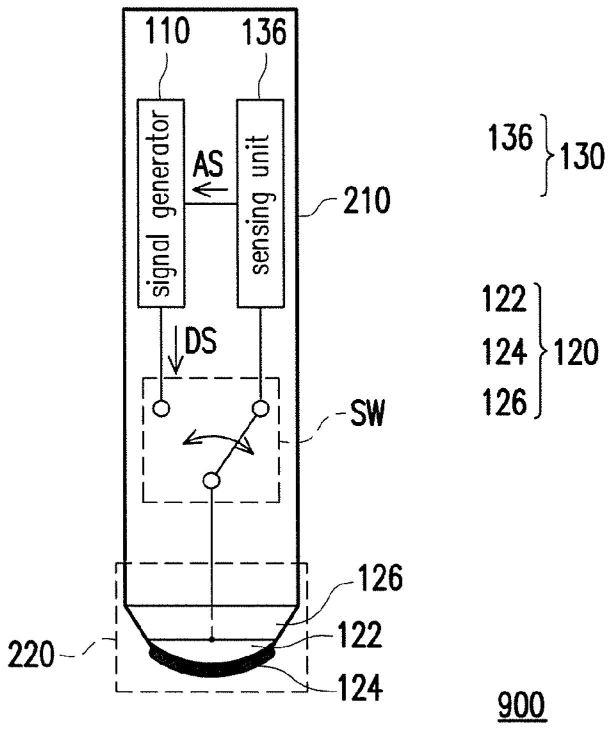
FIG. 9B is a schematic diagram illustrating the tactile feedback apparatus according to the embodiment of FIG. 9A.

FIG. 9B is a schematic diagram illustrating the tactile feedback apparatus according to the embodiment of FIG. 9A. In the present embodiment, the tactile feedback apparatus 900 further includes a switch SW having a first terminal coupled to the electrode 122, a second terminal coupled to the sensing unit 136 and a third terminal coupled to the signal generator 110. The switch SW is switched back and forth between the sensing unit 136 and the signal generator 110 in response to a control signal of a controller (not illustrated). When the switch SW is connected to the sensing unit 136 and the capacitance variation occurs on the electrode 122, according to the capacitance variation, the sensing unit 136 determines that the pressing operation occurs, and the activating signal AS is provided to control the signal generator 110 to provide the driving signal DS. The driving signal DS is transmitted to the electrode 122 when the switch SW is switched to connect the signal generator 110, and the electrode 122 generates various interactions together with the object surface as taught previously.

Figure 10:
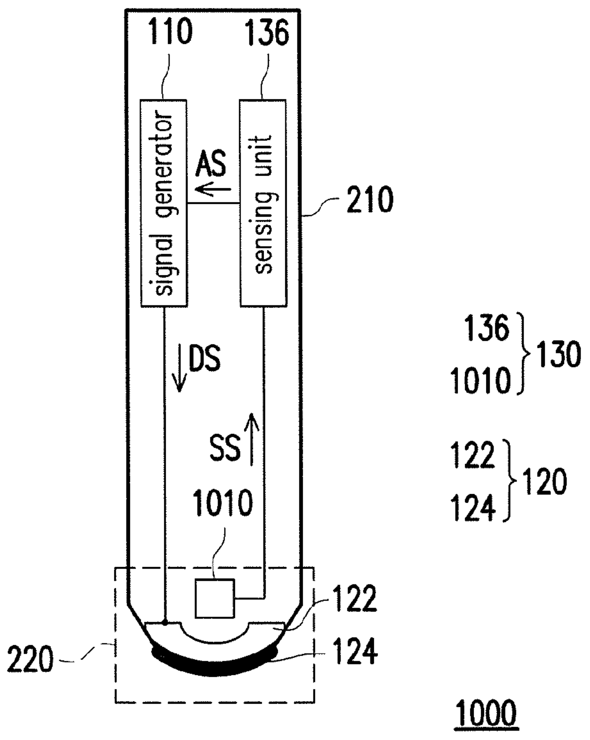
FIG. 10 is a schematic diagram illustrating the tactile feedback apparatus according to the embodiment of FIG. 3.

FIG. 10 is a schematic diagram illustrating the tactile feedback apparatus according to the embodiment of FIG. 3. In a tactile feedback apparatus 1000 of the present embodiment, the detection module 130 includes the sensing unit 136 and a photosensor 1010. The photosensor 1010 is disposed at the end 220, and determined whether the pressing operation occurs, based on a optical characteristic of the object surface. The optical characteristic of the object surface includes, for example, a light intensity or a color of the object surface. In other embodiments, the photosensor 1010 may further include a lens. The lens captures an image of the object surface, so as to obtain image content characteristics such as image resolution, image brightness, image spectrum distribution and number of colors which are related to the object surface, and used for determining whether the pressing operation occurs.

The sensing unit 136 is connected to the photosensor 1010 and the signal generator 110. When the photosensor 1010 determines that the pressing operation occurs, the photosensor 1010 provides the sensing signal SS to the sensing unit 136, and the sensing unit 136 provides the activating signal AS to the signal generator 110 in response to the sensing signal SS. The signal generator 110 provides the driving signal DS to the electrode 122, and the tactile feedback signal is generated by the electrode 122.

When the user uses the end 220 to touch the object surface, after the optical characteristic of the object surface is sensed, the photosensor 1010 provides the sensing signal SS to the sensing unit 136. The sensing unit 136 determines that the pressing operation occurs between the tactile feedback structure 120 and the object surface according to the sensing signal SS, and the activating signal AS is provided to control the signal generator 110 to provide the driving signal DS. The electrode 122 generates the tactile feedback signal according to the driving signal DS, and various interactions are generated together with the object surface as taught previously, and related description is omitted herein.

In other embodiments, the switch structure (not illustrated) as mentioned in the embodiment of FIG. 1 may be further disposed between the sensing unit 136 and the photosensor 1010 of FIG. 10, which is turned on or off in response to the switching operation of the user. When the switch structure is in the on-state, the sensing signal SS is transmitted to the sensing unit 136, and the sensing unit 136 provides the activating signal AS to the signal generator 110. The signal generator 110 provides the driving signal DS to the electrode 122 in response to the activating signal AS, and the electrode 122 generates various interactions together with the object surface as taught previously. When the switch structure is in the off-state, the tactile sensation is not correspondingly provided by the tactile feedback apparatus 1000 since the sensing signal SS is not transmitted to the detection module 130.

Figure 11:
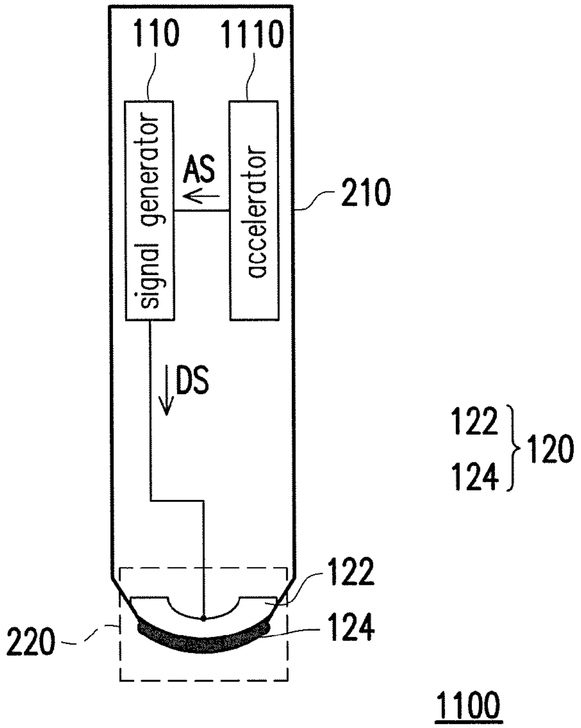
FIG. 11 is a schematic diagram illustrating the tactile feedback apparatus according to the embodiment of FIG. 2.

FIG. 11 is a schematic diagram illustrating the tactile feedback apparatus according to the embodiment of FIG. 2. In the present embodiment, besides elements depicted in FIG. 2, a tactile feedback apparatus 1100 further includes an accelerator 1110 which is connected to the signal generator 110. The accelerator 1110 is used to determine whether an acceleration for moving the tactile feedback apparatus 1100 exceeds a threshold value. If yes, the accelerator 1110 provides the activating signal AS to the signal generator 110 so as to control the signal generator 110 to provide the driving signal DS. Further, the accelerator 1110 adjusts the activating signal AS according to a moving speed of the tactile feedback apparatus 1100, and the signal generator 110 adjusts the driving signal DS accordingly. The signal generator 110 adjusts the electrical property of the driving signal DS according to the activating signal AS, and the tactile feedback apparatus 1100 correspondingly feedbacks different tactile sensations.

Figure 12:
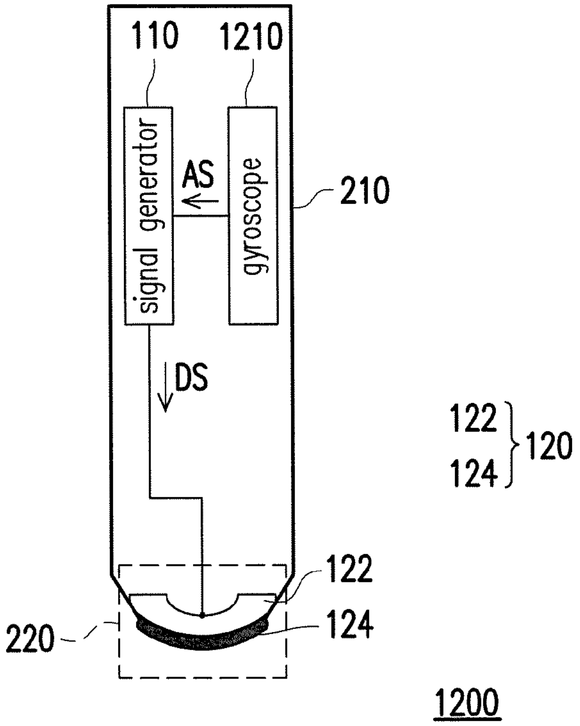
FIG. 12 is a schematic diagram illustrating the tactile feedback apparatus according to the embodiment of FIG. 2.

FIG. 12 is a schematic diagram illustrating the tactile feedback apparatus according to the embodiment of FIG. 2. In the present embodiment, besides elements depicted in FIG. 2, a tactile feedback apparatus 1200 further includes a gyroscope 1210 which is connected to the signal generator 110. The gyroscope 1210 is used to determine whether a horizontal shift of the tactile feedback apparatus 1200 exceeds a threshold value. If yes, the gyroscope 1210 provides the activating signal AS to the signal generator 110 so as to control the signal generator 110 to provide the driving signal DS. Further, the gyroscope 1210 adjusts the activating signal AS according to a degree of the horizontal shift of the tactile feedback apparatus 1200, and the signal generator 110 adjusts the driving signal DS accordingly. The signal generator 110 adjusts the electrical property of the driving signal DS according to the activating signal AS, and the tactile feedback apparatus 1200 correspondingly feedbacks different tactile sensations.

Figure 13:
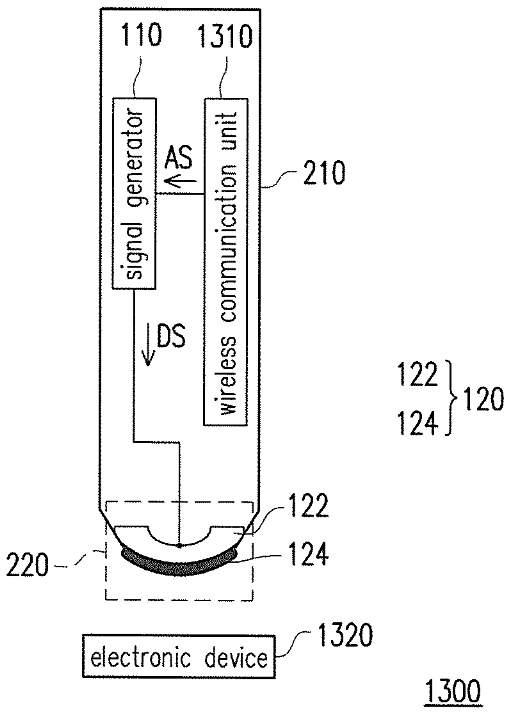
FIG. 13 is a schematic diagram illustrating the tactile feedback apparatus according to the embodiment of FIG. 2.

FIG. 13 is a schematic diagram illustrating the tactile feedback apparatus according to the embodiment of FIG. 2. In the present embodiment, besides elements depicted in FIG. 2, a tactile feedback apparatus 1300 further includes a wireless communication unit 1310 which is connected to the signal generator 110. The wireless communication unit 1310 is used to establish a connection with an electronic device 1320 having the object surface through a communication protocol. The communication protocol is, for example, communication protocols such as bluetooth, Zigbee, wireless fidelity (Wi-Fi), worldwide interoperability for microwave access (WiMAX), radio-frequency identification (RFID), and/or long term evolution (LTE), but the possible implementations of the disclosure is not limited to the above. The electronic device 1320 is, for example, devices such as PC, notebook PC, tablet PC, netbook, cell phone, smart phone and automatic teller machine, and the object surface is, for example, a screen surface of the electronic device 1320. When the tactile feedback apparatus 1300 moves on the object surface of the electronic device 1320, the wireless communication unit 1310 receives an intensity of a feedback signal from the electronic device 1320, and provide the activating signal AS to the signal generator 110 according to the intensity of the feedback signal, so as to control the signal generator 110 to provide the driving signal DS. The wireless communication unit 1310 adjusts the activating signal AS according to the intensity of the feedback signal, and the signal generator 110 adjusts the driving signal DS accordingly. The signal generator 110 adjusts the electrical property of the driving signal DS according to the activating signal AS, and the tactile feedback apparatus 1300 correspondingly feedbacks different tactile sensations.

Figure 14:
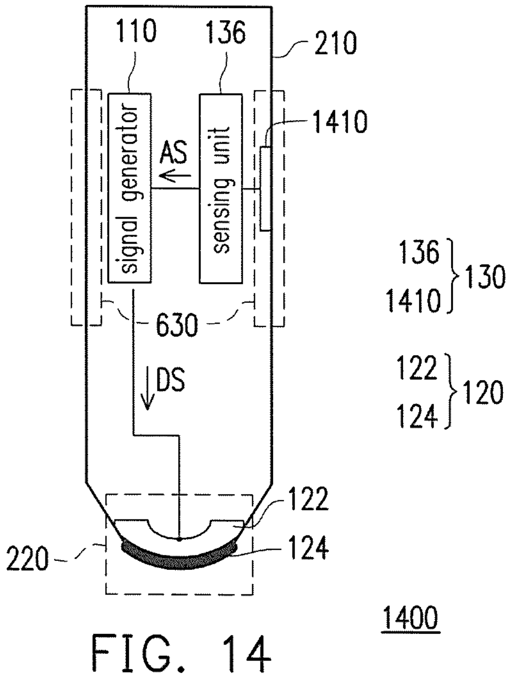
FIG. 14 is a schematic diagram illustrating the tactile feedback apparatus according to the embodiment of FIG. 3.

FIG. 14 is a schematic diagram illustrating the tactile feedback apparatus according to the embodiment of FIG. 3. In a tactile feedback apparatus 1400 of the present embodiment, the detection module 130 includes the sensing unit 136 and a temperature sensing layer 1410. The temperature sensing layer 1410 disposed at the grip portion 630, but the disclosure is not limited thereto. The sensing unit 136 is connected to the signal generator 110 and the temperature sensing layer 1410. The temperature sensing layer 1410 is a thermosensitive material, for example. When the user holds the grip portion 630, the temperature sensing layer 1410 senses a temperature variation generated by the user holding the grip portion 630, so as to correspondingly generate an electrical property variation (e.g., the resistance). When the electrical property variation exceeding the threshold value is generated by the temperature sensing layer 1410 in response to the temperature variation, the temperature sensing layer 1410 provides the activating signal AS to the signal generator 110.

In other embodiment, various tactile feedback apparatuses as listed above maybe disposed on a glove. For instance, the tactile feedback structure 120 is disposed on at least one finger tip of the glove, such that after the glove is wore, the use has a user experience like no others, owing to the tactile sensations fed back by the tactile feedback structure 120 on at least one finger tip. The glove disposed with the tactile feedback apparatus is applied in, for example, interactive games, or served as an auxiliary tactile tool for blinds, but the disclosure is not limited thereto. Furthermore, various tactile feedback apparatuses as listed above may also be disposed on a mouse or a keyboard, such that the user also correspondingly senses the tactile sensations fed back by the tactile feedback apparatus when operating the mouse or the keyboard.

According to the embodiments of the disclosure, the tactile feedback apparatus generates a corresponding electrical property according to the action force between the tactile feedback apparatus and the object surface. When the user uses the tactile feedback apparatus to touch the object surface, the variations of electrical property of the tactile feedback apparatus provide the user the tactile sensation similar to the concave-convex changes on the object surface.

Although the disclosure has been described with reference to the above embodiments, it is apparent to one of the ordinary skill in the art that modifications to the described embodiments may be made without departing from the spirit of the disclosure. Accordingly, the scope of the disclosure will be defined by the attached claims not by the above detailed descriptions.

What is claimed is:

1. A tactile feedback apparatus, comprising:

a signal generator provided a driving signal; and a tactile feedback structure connected to the signal generator and provided a tactile feedback signal in response to the driving signal when the tactile feedback structure touches an object surface or when a housing of the tactile feedback apparatus is touched, wherein the tactile feedback signal is related to a tactile sensation, wherein the tactile feedback signal is related to an electrical property of the driving signal, the electrical property includes a waveform frequency, a waveform shape, a waveform phase and a waveform amplitude of the driving signal.

2. The tactile feedback apparatus of claim 1, wherein the tactile feedback structure is disposed on an end of the housing, and the tactile feedback structure comprises:

an electrode connected to the signal generator and provided the tactile feedback signal in response to the driving signal; and an insulator disposed at one side of the electrode and provided the tactile feedback apparatus a contact portion for touching the object surface.

3. The tactile feedback apparatus of claim 2, further comprising a detection module connected to the signal generator and detected whether a pressing operation occurs, wherein when the pressing operation occurs, the detection module provides an activating signal to the signal generator so as to control the signal generator to provide the driving signal, wherein the pressing operation occurs between the housing and/or the tactile feedback structure and the object surface.

4. The tactile feedback apparatus of claim 3, wherein the insulator comprises a piezoelectric film, when the pressing operation occurs between the tactile feedback structure and the object surface, the piezoelectric film provides a sensing signal to the detection module through the electrode and the detection module provides the activating signal to the signal generator.

5. The tactile feedback apparatus of claim 3, wherein the detection module comprises:

a specific electrode disposed at the end, and generated a resistance variation in response to the pressing operation;

a sensing unit connected to the specific electrode and the signal generator, and provided the activating signal to the signal generator in response to the resistance variation; and a specific insulator disposed between the specific electrode and the electrode, and insulated the specific electrode from the electrode.

6. The tactile feedback apparatus of claim 3, wherein the detection module comprises:

a specific electrode disposed at the end, and generated a capacitance variation in response to the pressing operation;

a sensing unit connected to the signal generator and the specific electrode, and provided the activating signal to the signal generator in response to the capacitance variation; and a specific insulator disposed between the specific electrode and the electrode, and insulated the specific electrode from the electrode.

7. The tactile feedback apparatus of claim 3, wherein the housing comprises a grip portion, and the detection module comprises:

a specific electrode disposed at the grip portion; and a sensing unit connected to the signal generator and the specific electrode, and provided the activating signal to the signal generator when a resistance variation and/or a capacitance variation occurs on the specific electrode.

8. The tactile feedback apparatus of claim 3, wherein the housing comprises a grip portion, and the detection module comprises:

a first specific electrode disposed at the grip portion;

a second specific electrode disposed at the grip portion; and a sensing unit connected to the signal generator, the first specific electrode and the second specific electrode, and provided the activating signal to the signal generator when a resistance variation and/or a capacitance variation occurs between the first specific electrode and the second specific electrode.

9. The tactile feedback apparatus of claim 3, wherein the tactile feedback structure further comprises:

a specific electrode connected to the insulator and the signal generator;

a specific insulator connected to the electrode and the specific electrode; and wherein the electrode and the specific electrode are disposed at an identical side of the insulator, wherein the electrode and the specific electrode are disposed between the insulator and the specific insulator, the detection module comprising:

a sensing unit connected to the signal generator, the electrode and the specific electrode, and provided the activating signal to the signal generator when a capacitance variation occurs between the electrode and the specific electrode.

10. The tactile feedback apparatus of claim 9, wherein the signal generator further provides the driving signal to the specific electrode in response to the activating signal and the specific electrode generates the tactile feedback signal.

11. The tactile feedback apparatus of claim 3, wherein the tactile feedback structure further comprises:

a specific insulator connected to the electrode; and wherein the insulator and the specific insulator are respectively disposed at a first side and a second side of the electrode, the detection module comprising:

a sensing unit connected to the signal generator and the electrode, wherein the sensing unit provides the activating signal to the signal generator when a capacitance variation occurs on the electrode.

12. The tactile feedback apparatus of claim 3, wherein the detection module comprises:

a photosensor disposed at the end, and determined whether the pressing operation occurs based on a optical characteristic of the object surface; and a sensing unit connected to the photosensor and the signal generator, wherein when the photosensor determines that the pressing operation occurs, the photosensor provides a sensing signal to the sensing unit and the sensing unit provides the activating signal to the signal generator in response to the sensing signal.

13. The tactile feedback apparatus of claim 3, wherein the housing comprises a grip portion, and the detection module comprises:

a temperature sensing layer disposed at the grip portion; and a sensing unit connected to the signal generator and the temperature sensing layer, wherein the temperature sensing layer provides the activating signal to the signal generator when a resistance variation exceeding a threshold value is generated by the temperature sensing layer in response to a temperature variation.

14. The tactile feedback apparatus of claim 2, wherein the tactile feedback structure further comprises an accelerator connected to the signal generator, and determined whether an acceleration for moving the tactile feedback apparatus exceeds a threshold value;

if an acceleration for moving the tactile feedback apparatus exceeds a threshold value, the accelerator provides an activating signal to the signal generator to control the signal generator to provide the driving signal.

15. The tactile feedback apparatus of claim 2, wherein the tactile feedback structure further comprises a gyroscope connected to the signal generator, and determined whether a horizontal shift of the tactile feedback apparatus exceeds a threshold value;

if a horizontal shift of the tactile feedback apparatus exceeds a threshold value, the gyroscope provides an activating signal to the signal generator to control the signal generator to provide the driving signal.

16. The tactile feedback apparatus of claim 2, wherein the tactile feedback structure further comprises a wireless communication unit connected to the signal generator, and established a connection with an electronic device having the object surface through a communication protocol;

wherein when the tactile feedback apparatus moves on the object surface of the electronic device, the wireless communication unit receives an intensity of a feedback signal from the electronic device, and provides an activating signal to the signal generator according to the intensity of the feedback signal, so as to control the signal generator to provide the driving signal.

* * * * *